United States Patent [19]
> Kitami et al.

[11] Patent Number: 4,881,576
[45] Date of Patent: * Nov. 21, 1989

[54] HOSE FOR TRANSPORT OF REFRIGERANT FLUIDS AND FUEL OILS

[75] Inventors: Tetsu Kitami, Hadano; Jun Mito, Naka, both of Japan

[73] Assignee: The Yokohama Rubber Co., Ltd., Tokyo, Japan

[*] Notice: The portion of the term of this patent subsequent to Nov. 14, 2006 has been disclaimed.

[21] Appl. No.: 131,670

[22] Filed: Dec. 11, 1987

[30] Foreign Application Priority Data

Dec. 16, 1986 [JP] Japan ................................. 61-297720

[51] Int. Cl.⁴ .............................................. F16L 9/12
[52] U.S. Cl. ..................... 138/125; 138/137; 138/177; 138/DIG. 7; 428/474.7
[58] Field of Search ............... 138/123, 124, 125, 126, 138/127, 137, 141, 177, 178, DIG. 7; 428/36, 474.7, 474.9

[56] References Cited

U.S. PATENT DOCUMENTS

| | | | |
|---|---|---|---|
| 3,561,493 | 2/1971 | Maillard et al. | 138/141 |
| 3,584,656 | 6/1971 | Assendelet et al. | 138/141 |
| 3,762,986 | 10/1973 | Bhuta et al. | 428/474.7 |
| 3,805,848 | 4/1974 | Chrow | 138/144 X |
| 4,243,074 | 1/1981 | Strutzel et al. | 428/474.7 |
| 4,510,974 | 4/1985 | Natori et al. | 138/125 X |
| 4,613,532 | 9/1986 | Michel et al. | 138/177 |
| 4,633,912 | 1/1987 | Pilkington et al. | 138/DIG. 7 |
| 4,657,285 | 4/1987 | Akiyama et al. | 138/103 |

FOREIGN PATENT DOCUMENTS

| | | | |
|---|---|---|---|
| 0065278 | 11/1982 | European Pat. Off. | 428/474.7 |
| 54-31489 | 3/1979 | Japan | 428/474.9 |

*Primary Examiner*—James E. Bryant, III
*Attorney, Agent, or Firm*—Finnegan, Henderson, Farabow, Garrett & Dunner

[57] ABSTRACT

A hose for refrigerant fluid or fuel oil service which comprises a core tube, a reinforcing layer and an outer cover, the core tube being of a composite structure having an inner plastic peripheral wall, an intermediate plastic peripheral wall and an outer rubbery peripheral wall. The inner and intermediate walls are formed of a selected class of polyamides and polyolefins, whereby the hose is rendered highly impermeable to fluid and moisture, greatly resistant to stress cracking and sufficiently flexible.

5 Claims, 1 Drawing Sheet

HOSE FOR TRANSPORT OF REFRIGERANT FLUIDS AND FUEL OILS

BACKGROUND OF THE INVENTION

Field of the Invention:

This invention relates to hoses particularly suitable for use in the transportation of refrigerant fluids or fuel oils.

Description of the Prior Art:

Hoses have been proposed for use in conveying or otherwise handling refrigerant fluids such as Freon gases, or fuel oils such as gasoline and gas oil. One prior type of hose comprises a core tube including an inner peripheral wall made for instance of nitrile rubber which is relatively oil-resistant and fluid- and fuel-impermeable. Another type has rubbery and plastic inner walls disposed in a core tube.

Other physical characteristics are generally required with respect to flexibility, stress cracking resistance and moisture proofness.

Prior hoses of a composite structure are made up of a core tube, an outer cover and a reinforcing layer interposed therebetween, the core tube being formed solely from a rubbery material. This hose, though flexible and resistant to moisture, is not quite satisfactory as the core tube is permeable to fluid and to fuel. It is also known that core tubes can be formed with an inner wall of plastic material and an outer wall of rubbery material. The plastics are usually selected from polyamides such as nylon 6, nylon 6/66, nylon 11 and nylon 12. It has been found that nylon 6 and nylon 6/66 are satisfactory in resistance to Freon refrigerants but susceptible to stress cracking, while nylon 11 and nylon 12 are not sufficiently gas-impermeable.

SUMMARY OF THE INVENTION

It is the primary object of the invention to provide an improved hose for transporting refrigerant fluids or fuel oils which excels in impermeability to gas and to moisture, flexibility and mechanical strength.

Other objects and advantages of the invention will become apparent from the following description taken in connection with the accompanying drawing which illustrate by way of example a preferred embodiment of the invention.

According to the invention, a hose for use in transporting refrigerant fluids or fuel oils comprises (a) a core tube comprising an inner peripheral wall, an intermediate peripheral wall and an outer peripheral wall, the inner wall being formed predominantly of nylon 11 and/or nylon 12 , the intermediate wall being formed predominantly of nylon 6 and/or nylon 6/66, and the outer wall being formed of a rubbery material, (b) a reinforcing layer laminated over the outer wall, and (c) an outer cover disposed outwardly around the reinforcing layer.

DETAILED DESCRIPTION OF THE INVENTION

As used herein the following terms have the meanings respectively set forth below: (1) the term nylon 6 refers to polycaprolactam, which can be prepared by thermal polymerization of epsilon-aminocaproic acid; (2) nylon 11 refers to polyaminoundecanamide, which is the self-condensation product of 11-aminoundecanoic acid; (3) nylon 12 refers to polydodecanolactam, which is the self-condensation product of laurolactam; and (4) nylon 6/66 refers to a copolymer of nylon 6 and nylon 66. Nylon 66 refers to polyhexamethyleneadipamide, which can be prepared by the condensation of hexamethylenediamine and adipic acid.

Figure 1:
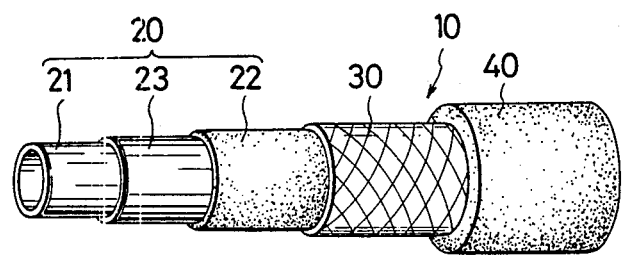
FIG. 1 is a perspective view, partly cut away, of a hose constructed in accordance with the invention.
Figure 2:
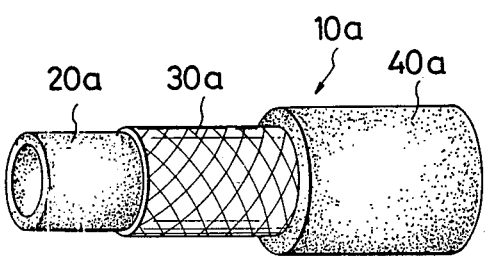
Figure 3:
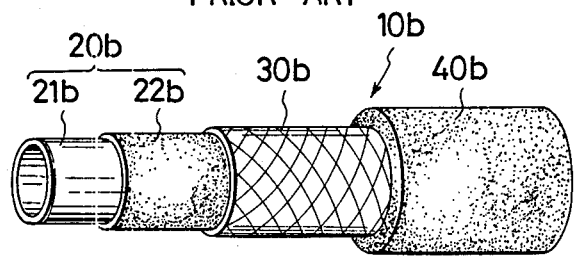

Referring to FIG. 1, there is shown a hose of a laminate construction provided in accordance with the invention and designated at reference numeral 10. The hose 10 comprises a core tube 20, a braided layer of reinforcement 30 and an outer cover 40 superimposed one on another. The reinforcing layer 30 may be made of textile yarns such as of rayon, nylon, polyester and vinylon. Any commonly known rubbery materials may be used for the outer cover 40.

According to an important aspect of the invention, the core tube 20 is of a multi-layered structure comprising an inner peripheral wall 21, an intermediate peripheral wall 23 and an outer peripheral wall 22 laminated in this order. An additional intermediate wall or walls may be disposed, where desired, to provide a variety of hose products.

The inner wall 21 may preferably be formed from polyamides, specific examples of which include nylon 11, nylon 12 and nylon 6. Nylon 11 and nylon 12 are predominant resins which may be used alone or in combination, or may be combined with another type of nylon such as nylon 6. In the case of polyblends, either or both of nylon 11 and nylon 12 should be incorporated in amounts larger than 60% by weight of the total blend, the balance being nylon 6. The inner wall should range in thickness from 5 to 25%, preferably 5 to 10%, based on the total thickness of the core tube. The inner wall so formed is highly resistant to stress cracking.

The intermediate wall 23 may suitably be made from either or both of nylon 6 and nylon 6/66 which are also blendable with nylon 11 and polyolefins. Typical examples of the polyolefins include polyethylene, polypropylene and the like. Polyblends should be composed of larger than 40% by weight of nylon 6 or nylon 6/66 or both and smaller than 60% by weight of nylon 11 and a polyolefin. Particularly preferred is a polyblend essentially comprising 40-80% by weight of nylon 6 or nylon 6/66, 5-30% by weight of nylon 11 and 10-40% by weight of a polyolefin. The thickness of the intermediate wall should be between 5 and 25%, preferably 5 and 20%, based on the total thickness of the core tube. The intermediate wall serves as a gross barrier to the entry of refrigerant gases. Advantageously, such wall results from polyamides similar to the inner wall, leading to integrated lamination with the latter wall and hence improved adhesive and structural strength.

Rubbery materials eligible for the outer wall 22 are rubbers of sufficient flexibility. Specific examples include nitrile-butadiene rubber (NBR), chlorosulfonated polyethylene (CSM), ethylene-propylenediene rubber (EPDM), butyl rubber (IIR), chlorinated butyl rubber (Cl-IIR), epichlorohydrin rubber (CHR and CHC), acrylic rubber (ACM) and the like. NBR, CSM, EPDM, CHR, CHC, IIR and Cl-IIR are preferred having regard to a good balance of physical characteristics with the inner and intermediate walls. The thickness of the outer wall should be in the range of 50-90%, preferably 60-80%, based on he total thickness of the core tube.

To attain firm lamination of the core tube, suitable bonding adhesives may be applied onto and inbetween the three peripheral walls, thereby rendering the resulting hose mechanically strong and durable.

The hose according to the invention may be fabricated by any suitable known methods. One such method involves passing a release-treated mandrel through a dual extruder equipped with heads from which two groups of resins are extruded peripherally on the mandrel and thus form a two-wall, inner and intermediate, plastic tube. The tube-carrying mandrel is allowed to successively enter a rubber extruder at which time an outer wall of rubbery material is laminated over the plastic tube to thereby form a core tube. To facilitate bonding between the plastic and rubbery walls, it is convenient to coat the plastic tube as by spraying with a chlorinated rubber, phenolic resin or HRH (silica-resorcinol donor-methylene donor) adhesive.

A layer of reinforcement is laminated by braiding suitable textile yarns over the outer rubbery wall of the core tube. An outer cover is disposed outwardly about the braided layer by extrusion of a predetermined rubbery material.

The resulting hose body is vulcanized under pressure at 130°–170° C., preferably 140°–160° C., and subsequently cooled. The mandrel is afterwards pulled out of the vulcanized hose body, whereby a desired hose product is obtained.

The hose of the invention is smaller than about 5 g/m/72 hours in gas permeability as determined at 100° C. for 96 hours and longer than 30 days in stress cracking resistance as determined at 100° C. on contact with aqueous zinc chloride. Details as regards the methods of measurement will be later described.

The following examples are given to further illustrate the invention, but should not be regarded as limiting the invention.

EXAMPLE 1-12

AND

COMPARATIVE EXAMPLES 1-10

Different hoses were prepared according to the formulations shown in Tables 1 and 2. Gas impermeability, stress cracking resistance, flexibility and moisture proofness of the hoses were examined under the conditions given below and with the results tabulated.

TEST NYLON RESINS

N-6: nylon 6, CM 1041, Toray Industries, Inc.
N-11: nylon 11, BESNO TL, Atochem Co.
N-12: nylon 12, AESNO TL, Atochem Co.
N-6-66: nylon 6-nylon 66 copolymer
N-6/11/POL: nylon 6-nylon 11-polyolefin blend
76.2/19.0/4.8 parts by weight (Example 2)
59.6/27.5/14.9 parts by weight (Examples 7, 10, 11 and 12; 58.2/14.5/27.3 parts by weight (Example 8)

TEST RUBBER MATERIALS CSM:

CSM : 100 (parts by weight), Hypalon 40, E. I. DuPont De Nemours & Co.
carbon black : 60, Asahi No. 50, Asahi Carbon Co.
polyethylene : 3, AC Polyethylene, Allied Chemical Co.
magnesia : 5
antioxidant : 1, Nocrac NBC, Ohuchi Shinko Chemical Industrial Co.
plasticizer (DOP): 10, Chisso Petrochemical Co.
litharge : 5, Yellow No. 1
accelerator (TRA): 1.5, Sunceller TRA, Sanshin Chemical Industries Co.

CR:
CR : 100, Neoprene W, Showa Neoprene Co.
carbon black : 60, Asahi No. 50, Asahi Carbon Co.
stearic acid : 1
magnesia : 4
antioxidant : 2, Antage OD, Kawaguchi Chemical Co.
softener : 10, Fuccol 1150N, Fuji Kosan Co.
zinc oxide . : 5
accelerator (TU): 0.75, Sunceller 22, Sanshin Chemical Industries Co.

Cl-IIR:
Cl-IIR : 100, Chlorobutyl 1066, Esso Chemicals Co.
carbon black : 80, Asahi No. 50, Asahi Carbon Co.
stearic acid : 2
antioxidant : 2, Antage OD, Kawaguchi Chemical Co.
softener : 5, Machine Oil 22, Fuji Kosan Co.
magnesia : 1
zinc oxide : 5
accelerator (TS): 2, Sunceller MSPO, Sanshin Chemical Industries Co.

EPDM:
EPDM : 100, Esprene 305, Sumitomo Chemical Co.
carbon black : 100, Asahi No. 50, Asahi Carbon Co.
process oil : 60, Machine Oil 22, Fuji Kosan Co.
zinc oxide : 5
stearic acid : 1
accelerator (BZ) : 2, Soccinol BZ, Sumitomo Chemical Co.
accelerator (TT) : 0.5, Soccinol TT, Sumitomo Chemical Co.
accelerator (TRA): 0.5, Soccinol TRA, Sumitomo Chemical Co.
accelerator (M) : 1, Soccinol M, Sumitomo Chemical Co.

NPR:
NBR : 100, Nipol 1042, Nippon Zeon Co.
carbon black : 80, Asahi No. 50, Asahi Carbon Co.
zinc oxide : 5
stearic acid : 1
antioxidant : 1, Antage OD, Kawaguchi Chemical Co.
plasticizer (DOP): 10, Chisso Petrochemical Co.
accelerator (TS) : 1, Sunceller SPO, Sanshin Chemical Industries Co.

TEST PROCEDURES

Freon Gas Permeation Test

JRA 2001 of the Japan Refrigerating and Air-Conditioning Association was followed. A 45 cm long test hose having metal end fittings was charged with a Freon refrigerant in an amount of 0.6±0.1 gf per cubic centimeter, followed by disposition at 100° C. for 96 hours. Gas impermeability was determined by gas leaks after a lapse of from 24 to 96 hours and indicated in terms of g/m/72 hr.

Stress Cracking Test

Stress cracking is a phenomenon in which stress cracks would result from exposure to metal ions, particularly Zn ions, eluted from metal conduits, or to those present in lubricating oils. Zinc chloride among metal ion chlorides is notoriously sensible for such quality deterioration.

Onto No. 1 dumbbell specimen stipulated in JIS K6301 and resulting from an extruded tube was applied aqueous 50% zinc chloride in droplets. The specimen was disposed still at 100° C. Zinc chloride droplets were repeated at an interval of 24 hours to inspect cracks that had developed in the vicinity of the droplets on the specimen. Cracking resistance was adjudged by the length of time (day) required for cracks to occur.

Flexibility Test

A test hose was arcuately bent at a bend radius of 10 times its outer diameter, followed by measurement of bending stresses (n=2) ranging in bend radius from 10 to 3 times. Flexibility was determined by bending strength (kgf) read at a bend radius of 4 times from the curve of stresses plotted against radii.

Moisture Permeation Test

A test hose was placed in an oven at 50° C. for 5 hours and thereafter filled with a desiccant, molecular sieve 3A, to a volume of 80%. The sealed hose was disposed at 50° C. and at 95% RH. The desiccant was weighed at an interval of 120 hours and up to 480 hours. Moisture proofness was determined by weight increases (mgf/cm$^2$/day) in the desiccant.

EVALUATION OF THE TEST RESULTS

Examples 1-12 representing the invention are all satisfactory in respect of all the physical characteristics tested.

Controls were divided into three groups, one having no intermediate wall disposed, another group being devoid of both inner and intermediate walls, and a further group using an inner wall alone.

A control in which N-11 alone was used, though acceptable in stress cracking resistance, was insufficient in refrigerant impermeability as demonstrated by Comparative Example 1. The use of N-6, Comparative Example 2, produced results contrastive to Comparative Example 1. Small inner wall and large outer wall thicknesses, Comparative Example 3, showed reduced resistance to stress cracking. In the case where inner and outer walls were substantially identical in thickness, N-6 failed to give sufficient stress cracking resistance, whereas N-11 revealed inadequate gas impermeability as was apparent from Comparative Examples 4 and 5. A control of Comparative Example 10 in which an inner wall of larger thickness was used without an outer wall was unacceptable in gas resistance and flexibility. Comparative Examples 6–9 were ineffective for improving impermeability to refrigerants.

While a certain preferred embodiment has been shown for the purpose of illustrating the invention, it will be apparent to those skilled in the art that various changes and modifications may be made to the invention without departing from the scope of the appended claims.

TABLE 1

| formulations/ properties | Examples | | | | | | | |
|---|---|---|---|---|---|---|---|---|
| | 1 | 2 | 3 | 4 | 5 | 6 | 7 | 8 |
| inner wall | | | | | | | | |
| polymer | N-11 | N-11 | N-11 | N-11 | N-12 | N-11 | N-11 | N-11 |
| thickness (mm) | 0.1 | 0.1 | 0.1 | 0.2 | 0.1 | 0.1 | 0.1 | 0.1 |
| intermediate wall | | | | | | | | |
| polymer | N-6 | N-6/11/POL | N-6 | N-6 | N-6 | N-6-66 | N-6/11/POL | N-6/11/POL |
| thickness (mm) | 0.6 | 0.3 | 0.3 | 0.4 | 0.3 | 0.3 | 0.3 | 0.3 |
| outer wall | | | | | | | | |
| rubber | CSM | CSM | CSM | CSM | CSM | CSM | CSM | CSM |
| thickness (mm) | 1.3 | 1.6 | 1.6 | 1.4 | 1.6 | 1.6 | 1.6 | 1.6 |
| reinforcing layer | | | | | | rayon braid | | |
| outer cover | | | | | | | | |
| material | CSM | CSM | CSM | CSM | CSM | CSM | CSM | CSM |
| thickness (mm) | 2.0 | 2.0 | 2.0 | 2.0 | 2.0 | 2.0 | 2.0 | 2.0 |
| gas permeation (gf/m/72 hr) | 1.0 | 1.0 | 1.2 | 1.1 | 1.2 | 1.1 | 2.3 | 2.6 |
| stress cracking resistance (day) | 30> | 30> | 30> | 30> | 30> | 30> | 30> | 30> |
| flexibility (kgf) | 2.32 | 2.15 | 2.20 | 2.35 | 2.25 | 2.33 | 1.70 | 1.74 |
| moisture permeation (mgf/cm/day) | 0.38 | 0.32 | 0.28 | 0.32 | 0.29 | 0.28 | 0.29 | 0.29 |

| formulations/ properties | Examples | | | |
|---|---|---|---|---|
| | 9 | 10 | 11 | 12 |
| inner wall | | | | |
| polymer | N-11 | N-11 | N-11 | N-11 |
| thickness (mm) | 0.1 | 0.1 | 0.2 | 0.1 |
| intermediate wall | | | | |
| polymer | N-6 | N-6/11/POL | N-6/11/POL | N-6/11/POL |
| thickness (mm) | 0.3 | 0.3 | 0.4 | 0.3 |
| outer wall | | | | |
| rubber | NBR | NBR | NBR | Cl-IIR |
| thickness (mm) | 1.6 | 1.6 | 1.4 | 1.6 |
| reinforcing layer | | | rayon braid | |
| outer cover | | | | |
| material | CR | CR | CR | CR |
| thickness (mm) | 2.0 | 2.0 | 2.0 | 2.0 |
| gas permeation (gf/m/72 hr) | 1.2 | 2.4 | 1.1 | 3.0 |
| stress cracking resistance (day) | 30> | 30> | 30> | 30> |
| flexibility (kgf) | 2.38 | 1.47 | 1.61 | 1.51 |
| moisture permeation | 0.56 | 0.60 | 0.42 | 0.22 |

TABLE 1-continued (mgf/cm/day)

TABLE 2

| formulations/ properties | Comparative Examples | | | | | | | | | |
|---|---|---|---|---|---|---|---|---|---|---|
| | 1 | 2 | 3 | 4 | 5 | 6 | 7 | 8 | 9 | 10 |
| inner wall | | | | | | | | | | |
| polymer | N-11 | N-6 | N-6 | N-6 | N-11 | — | — | — | — | N-11 |
| thickness (mm) | 0.35 | 0.35 | 0.1 | 1.0 | 1.0 | — | — | — | — | 2.0 |
| intermediate wall | | | | | | | | | | |
| polymer | — | — | — | — | — | — | — | — | — | — |
| thickness (mm) | — | — | — | — | — | — | — | — | — | — |
| outer wall | | | | | | | | | | |
| rubber | CSM | CSM | CSM | CSM | CSM | NBR | NBR | CSM | Cl-IIRI | — |
| thickness (mm) | 1.65 | 1.65 | 1.9 | 1.0 | 1.0 | 2.0 | 2.0 | 2.0 | 2.0 | — |
| reinforcing layer | | | | | | rayon braid | | | | |
| outer cover | | | | | | | | | | |
| material | CSM | CSM | CSM | CSM | CSM | CSM | CR | CSM | CSM | CR |
| thickness (mm) | 2.0 | 2.0 | 2.0 | 2.0 | 2.0 | 2.0 | 2.0 | 2.0 | 2.0 | 2.0 |
| gas permeation (gf/m/72 hr) | 9.8 | 1.2 | 2.1 | 0.9 | 8.4 | 24.0 | 24.1 | 23.8 | 26.1 | 6.2 |
| stress cracking resistance (day) | 30> | 2 | 2 | 6 | 30> | — | — | — | — | 30> |
| flexibility (kgf) | 2.08 | 2.49 | 2.13 | 2.70 | 2.50 | 2.00 | 2.04 | 2.10 | 1.80 | 3.10 |
| moisture permeation (mgf/cm/day) | — | — | — | — | 0.36 | 0.60 | 1.61 | 0.30 | 1.20 | 0.80 |

What is claimed is:

1. A hose for use in transporting refrigerant fluids or fuel oils which hose comprises:
   (a) a core tube comprising an inner peripheral wall, an intermediate peripheral wall and an outer peripheral wall, said inner wall being formed of a first resin which is predominately nylon 11 or nylon 12, or a combination thereof; said intermediate wall being formed of a second resin which essentially comprises 40–80% by weight of nylon 6 or nylon 6/66, 5–30% by weight of nylon 11 and 10–40% by weight of a polyolefin; and said outer wall being formed of a rubbery material;
   (b) a reinforcing layer laminated over said outer wall; and
   (c) an outer wall disposed outwardly around said reinforcing layer, said hose having a high gas impermeability and a high resistance to stress cracking.

2. The hose of claim 1, wherein said first resin comprises more than 60% by weight of nylon 11 or nylon 12, or a combination thereof, and less than 40% by weight of nylon 6.

3. The hose of claim 1, said rubbery material being nitrile-butadiene rubber, chlorosulfonated polyethylene rubber, ethylene-propylene-diene rubber, butyl rubber, chlorinated butyl rubber, epichlorohydrin rubber or acrylic rubber.

4. The hose of claim 1, said inner wall having a thickness of 5–25 percent based on the total thickness of said inner tube, said intermediate wall having a thickness of 5–25 percent based on the total thickness of said inner tube, and said outer wall having a thickness of 50–90 percent based on the total thickness of said inner tube.

5. The hose of claim 1 having a gas impermeability of smaller than about 5 g/m/72 hours as determined at 100° C. for 96 hours, and a stress cracking resistance of longer than 30 days as determined at 100° C. on contact with aqueous zinc chloride.

* * * * *